United States Patent Office 2,990,239
Patented June 27, 1961

2,990,239
PREPARATION OF MONOBROMODECABORANE

Murray S. Cohen, Morristown, N.J., and Carl E. Pearl, Azusa, Calif., assignors to Thiokol Chemical Corporation, Trenton, N.J., a corporation of Delaware
No Drawing. Filed May 1, 1958, Ser. No. 733,241
3 Claims. (Cl. 23—14)

This invention relates to a new composition of matter, monobromodecaborane, and a method for its preparation.

The new composition of matter of this invention has a general formula $B_{10}H_{13}Br$ and melts at about 108–109.5° C. Monobromodecaborane can be used as an intermediate in the synthesis of many mono-substituted decaborane derivatives. It is also useful in solid propellant fuels when incorporated with suitable oxidizers, such as ammonium perchlorate, potassium perchlorate, sodium perchlorate, ammonium nitrate, and so forth. The solid propellant formed is suitable for rocket power plants and other jet propelled devices. Monobromodecaborane, when incorporated with an oxidizer, is capable of being formed into a wide variety of grains, tablets and shapes, all with desirable mechanical and chemical properties. Propellants thus produced burn uniformly without disintegration when ignited by conventional means, such as a pyrotechnic type igniter, and are mechanically strong enough to withstand ordinary handling.

In accordance with this invention, monobromodecaborane is produced by the reaction of decaborane with bromine in the presence of a Friedel-Crafts type catalyst, such as aluminum chloride, aluminum bromide, ferric chloride, ferric bromide, zinc chloride or the like. The method of preparation of the new compound is more fully illustrated in the following examples.

Example I

A 1000 ml. glass 3-necked flask was equipped with a dropping funnel, a magnetic stirrer and a thermometer, and was placed under a blanket of nitrogen. To this flask there was added a solution containing 48.8 grams (0.40 mole) of decaborane in 300 ml. of carbon bisulfide. Suspended in the solution were 6.60 grams (0.05 mole) of anhydrous aluminum chloride. Stirring was begun and 1.0 ml. of a solution containing 64.0 grams (0.40 mole) of bromine and 100 ml. of carbon bisulfide was added. After a few minutes, the red bromine color disappeared and the reaction mixture was cooled to −10° C. At this temperature the remainder of the bromine solution was added over a period of 1.5 hours. The bromine color was discharged on contact with the hydride solution and hydrogen bromide was smoothly evolved. At the end of the reaction, the solution was a straw color. The flask was then placed on a hot water bath and allowed to remain until the carbon bisulfide solution was evaporated, then the residue within the flask was extracted with five 150 ml. portions of boiling hexane. The hexane extracts were combined and the residue consisting of about 5.0 grams of a dark oil was discarded. The hexane solution was then placed in a glass flask and cooled to −80° C. at which time crystals formed. The crystals were collected on a filter and then dried under vacuum (1 mm. of mercury). The product weighed 69.0 grams and melted over a wide range. The product was then recrystallized from a 200 ml. solution of normal heptane and yielded white crystals with a melting point of 102–107.5° C. This product weighed 40 grams and an additional 6.5 grams of a high melting point material were removed from the mother liquor. Two additional crystallizations of this product from normal heptane yielded a white crystalline solid having a melting point of 108–109° C. Infrared and wet chemical analysis indicated the product to be monobromodecaborane.

Example II

A 1000 ml. glass 3-necked flask was equipped with a dropping funnel, a magnetic stirrer and a thermometer and kept under a blanket of nitrogen. To this flask there was added a solution containing 20.0 grams of decaborane and 650 ml. of carbon bisulfide and 10.0 grams of aluminum chloride. This mixture was stirred at room temperature while a mixture of 9.0 ml. of bromine and 50 ml. of carbon bisulfide was added over a period of ½ hour. After the addition, the reactants were stirred at room temperature for 5 hours. During the bromine addition and during subsequent stirring, effluent gases were evolved from the reaction and were removed from the reaction zone by a slow stream of nitrogen gas. The reaction flask was then placed in a hot water bath and the carbon bisulfide distilled off, leaving a residue of 19.2 grams of white crystalline solids (melting point 107–109° C.). Recrystallization of this solid product from heptane gave 7.2 grams of a white solid (melting point 102–106° C.). Analyses of the purified material gave the following results:

|  | 1 | 2 | 3 | Calculated for Monobromodecaborane |
|---|---|---|---|---|
| Percent Bromine | 39.6 | 39.5 | 39.2 | 39.8 |
| Percent Boron | 52.4 | 55.4 | 49.5 | 53.9 |

A repeated crystallization of the product from heptane gave the material which melted at 108–109.5° C. and had molecular weight determinations of 193 and 201 as compared with the expected 201 for monobromodecaborane. Infrared anaylsis of the product indicated it to be monobromodecaborane.

Various modifications can be made in the procedures of these specific examples to provide other embodiments which fall within the scope of this invention. The relative amounts of decaborane and bromine employed in carrying out the reaction can be varied widely. In general, however, the molar ratio of decaborane to bromine utilized in preparing the monobromodecaborane will be within the range from 0.25 to 4, best results being obtained, however, when approximately equal molar quantities of the reactants are used. Likewise, the reaction temperature can be varied widely, generally between −40° C. to 80° C., with best results being obtained between −30° C. to 45° C. The reaction time can be be varied widely, but will generally be within the range from approximately 1 hour to 50 hours or somewhat more. Usually, up to a certain point, improved yields obtained as the reaction time is increased.

The reaction between the decaborane and the bromine to produce the monobromodecaborane is carried out while the reaction mixture contains a catalytic amount of Friedel-Crafts catalyst. Aluminum chloride was utilized in the experimental work described above. In its place, however, there can be used other Friedel-Crafts catalysts, for example, aluminum bromide, ferric chloride, ferric bromide, zinc chloride, stannic chloride, etc. Usually, from 0.005 mole to 2 moles of catalyst are used per mole of decaborane present in the reaction mixture. The reaction can be carried out with the reactants and catalyst admixed in a solvent reaction medium, or in the absence of a solvent reaction medium. Preferably, however, a solvent reaction medium is utilized, and when one is used the amount of solvent present in the reaction mixture will generally be from 50 to 99 percent by weight, based upon the total weight of the reaction mixture including the solvent, reactants and catalyst. The solvent utilized should be inert under the reaction conditions and can be, for example, carbon bisulfide, 1,1,1-trichloroethane, 1,1,2-trichloroethane, 1,1,1,2 - tetrachloroethane, pentachloroethane, trichloroethylene or tetrachloroethylene, as well as s-tetrachloroethane. On the other hand, normal liquid paraffin, cycloparaffin and aromatic compounds can also be used as the reaction medium, for example, n-heptane, n-octane, 2,2,4 - trimethylpentane, cyclopentane, methylcyclopentane, cyclohexane, methylcyclohexane, benzene, toluene, the xylenes and so forth.

The crystalline monobromodecaborane is very soluble in benzene, ether, ethylacetate, and methylene chloride. It is soluble in hot heptane and sparingly soluble in the cold solvent. The compound is insoluble in water and dissolves in ethanol and methanol with vigorous exothermic decomposition. This reaction with alcohol is far more rapid than the same reaction between decaborane and alcohol.

Monobromodecaborane produced by practicing the method of this invention can be employed as an ingredient of solid propellant compositions in accordance with general procedures which are well understood in the art, inasmuch as the solid produced by practicing the present process is readily oxidized using conventional solid oxidizers, such as ammonium perchlorate, potassium perchlorate, sodium perchlorate, ammonium nitrate and the like. In formulating a solid propellant composition employing the material produced in accordance with the present invention, generally from 10 to 35 parts by weight of monobromodecaborane and from 65 to 90 parts by weight of oxidizer, such as ammonium perchlorate, are present in the final propellant composition. In the propellant, the oxidizer and the product of the present process are formulated in intimate admixture with each other as by finally subdividing each of the materials separately and thereafter intimately admixing them. The purpose of so doing, as the art is well aware, is to provide proper burning characteristics in the final propellant. In addition to the oxidizer and the oxidizable material, the final propellant can also contain on artificial resin, generally urea-formaldehyde or phenol-formaldehyde, the function of this resin being to give the propellant mechanical strength and at the same time improve the burning characteristics. Thus, in manufacturing a suitable propellant, proper proportions of finely divided oxidizer and finely divided monobromodecaborane material are admixed with a high solids content solution of partially condensed urea-formaldehyde or phenol-formaldehyde resin, the proportion being such that the amount of the resin is about 5 to 10 percent by weight, based on the weight of the oxidizer and the boron compound. The ingredients are thoroughly mixed and the solvent-free mixture then molded to the desired shape, as by extrusion. Thereafter, the resin can be cured by resorting to heating at moderate temperatures. For further information concerning the formulation of solid propellant compositions, reference is made to Bonell's U.S. Patent No. 2,622,277 and Thomas' U.S. Patent No. 2,646,596.

What is claimed is:

1. A method for the preparation of monobromodecaborane which comprises reacting decaborane and bromine in an inert organic solvent reaction medium at a temperature range from —30° C. to 45° C. while the reaction mixture contains a catalytic amount of a Friedel-Crafts catalyst, and recovering monobromodecaborane from the reaction mixture.

2. The method of claim 1 wherein the Friedel-Crafts catalyst is aluminum chloride.

3. A method for the preparation of monobromodecaborane which comprises reacting one mole of decaborane and from 0.25 to 4 moles of bromine at a temperature within the range from —30° C. to 45° C. while the reaction mixture contains as a reaction catalyst from 0.005 to 2 moles of aluminum chloride and while the reaction mixture also contains from 50 percent by weight to 99 percent by weight of carbon bisulfide based upon the weight of the reaction mixture, and recovering monobromodecaborane from the reaction mixture.

References Cited in the file of this patent

Schaeffer et al.: "Abstracts of Papers, 130th Meeting, American Chemical Society, September 16 to 21, 1956," page 34R.

Schlesinger et al.: "Chem. Reviews," vol. 31, pp. 10, 11, No. 1, August 1942.

Hurd: "Chemistry of the Hydrides," pp. 81–83, John Wiley and Sons, 1952.

Stone: "Quarterly Reviews," vol. 9, No. 2, pp. 176 (1955).

Schlesinger et al.: "J. Am. Chem. Soc." vol. 75, page 187, January 5, 1953.